United States Patent [19]

Andras

[11] 3,717,428
[45] Feb. 20, 1973

[54] MOLD BASE ADAPTER
[75] Inventor: John Andras, Detroit, Mich.
[73] Assignee: USI Corporation, Pasadena, Calif.
[22] Filed: March 8, 1971
[21] Appl. No.: 122,042

[52] U.S. Cl. ................................425/191, 425/472
[51] Int. Cl. ..........................................B29c 1/00
[58] Field of Search......18/42 D, 42, 30 WM, 30 WC, 18/30 WN, 34 R; 425/182, 191, 192, 450, 472; 249/219 R

[56] References Cited

UNITED STATES PATENTS 3,427,688 2/1969 Wilson..............................18/42 D X
3,049,758 8/1962 Drevalas..............................18/42 D
3,289,252 12/1966 Bromley..............................18/42 D Primary Examiner—Robert L. Spicer, Jr.
Attorney—Sokolski & Wohlgemuth and Robert M. Ashen

[57] ABSTRACT

An adapter plate system and corresponding mold bases for use with injection molding assemblies to secure the mold bases to varying press platens which comprises two adapter plates having a plurality of apertures therein so that they can be secured to various standard press platens, the plates further having means for aligning one half of a mold base therewith and means for fixedly securing each half to each plate.

5 Claims, 7 Drawing Figures

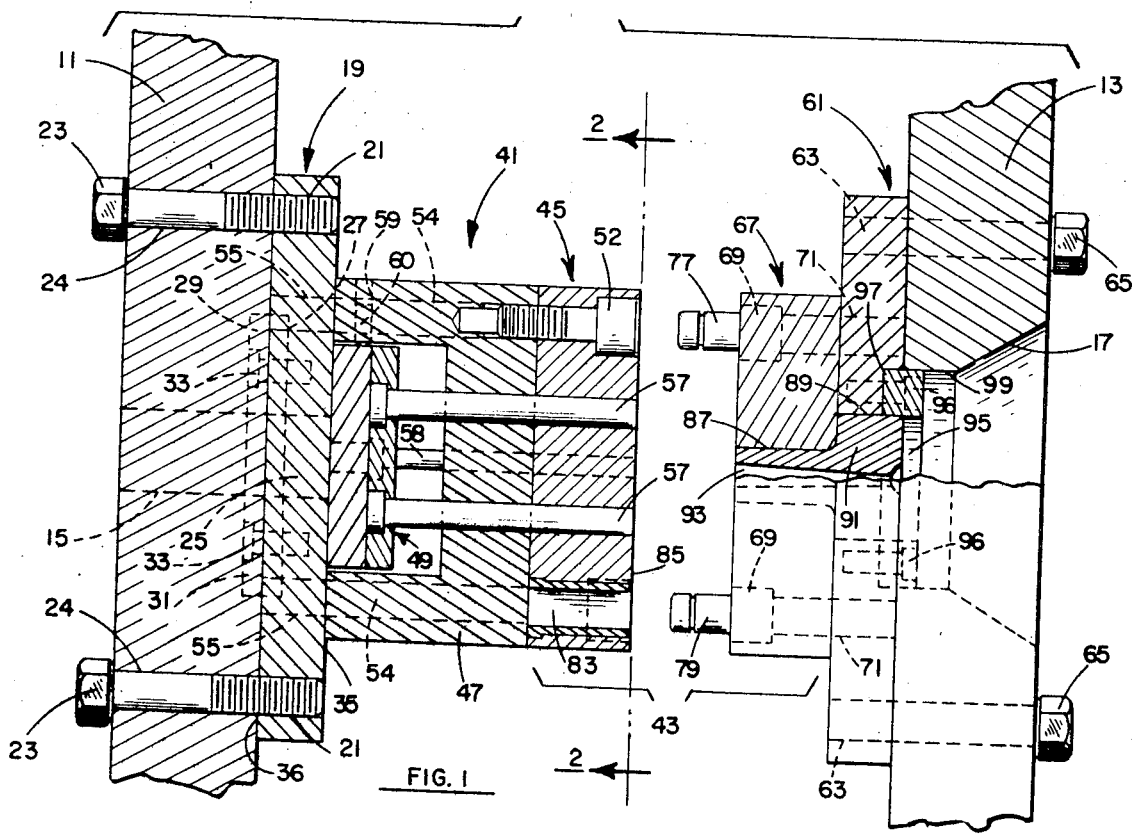
FIG. 1
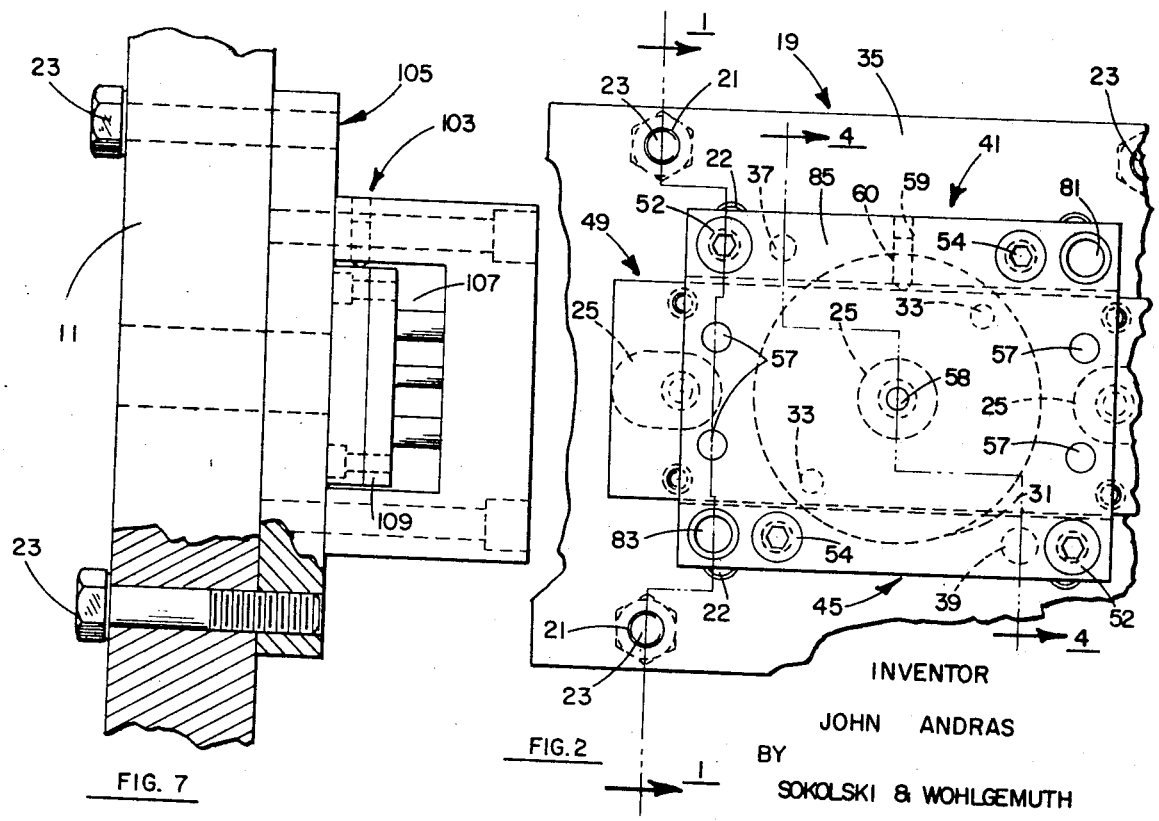
FIG. 7
FIG. 2
INVENTOR
JOHN ANDRAS
BY
SOKOLSKI & WOHLGEMUTH
ATTORNEYS

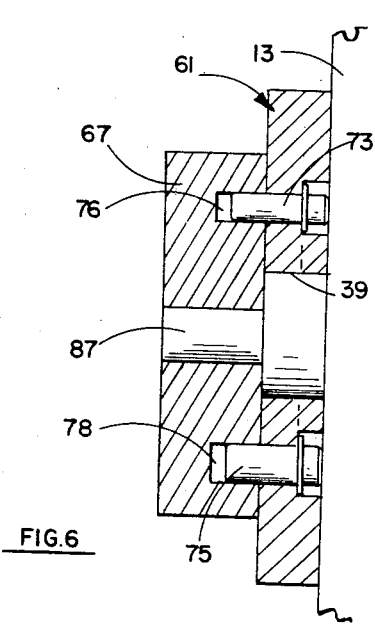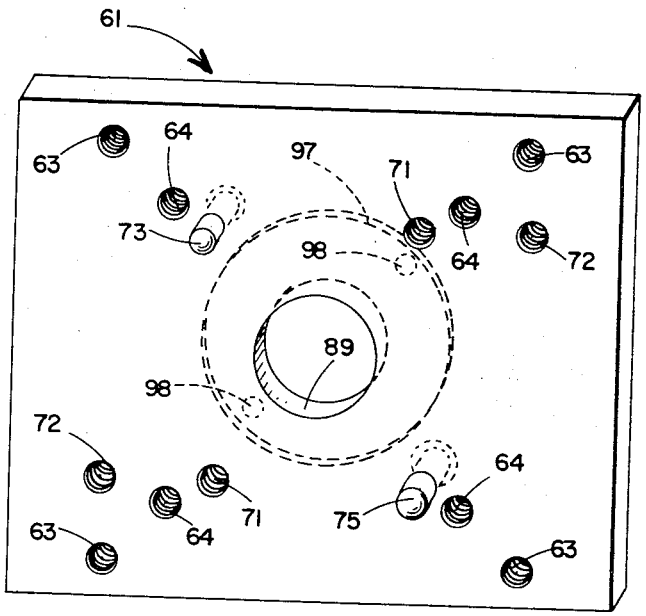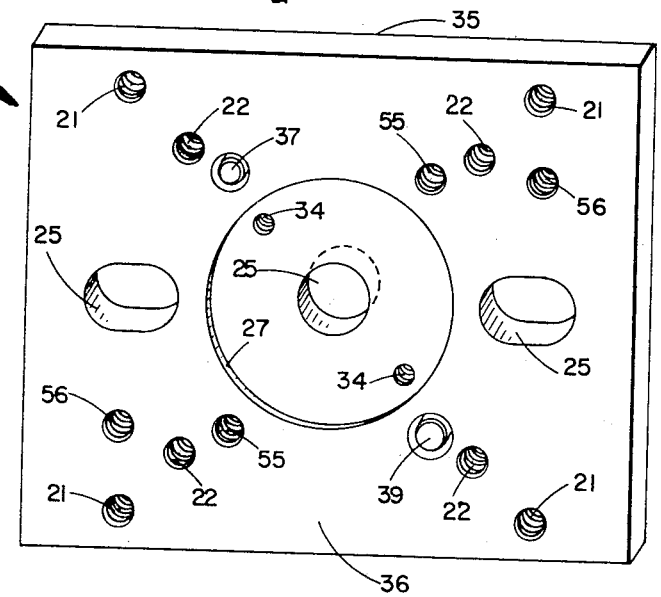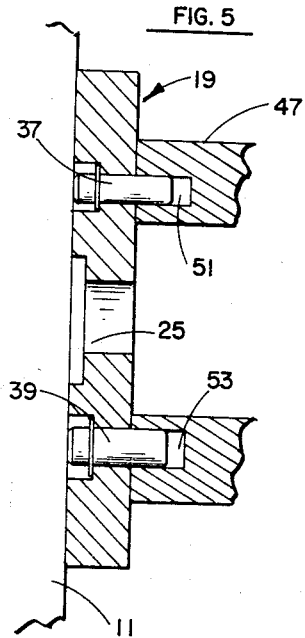

MOLD BASE ADAPTER

There are several differing manufacturers of presses utilizable for injection molding. The user of a mold base normally owns one or more of the given available presses. One half of a mold base is secured to each platen of these presses when the presses are used for injection molding. The manufacturers of the mold bases, however, are not normally the same company that manufacture the presses and this, in the past, have found it necessary, at times, to provide particularly designed mold bases to fit given presses. Alternatively, there have been previously designed means for adapting a given mold base to the varying presses. The problems attendant with an adaptation of a single mold base to varying presses is one of alignment particularly when a smaller than normally used mold base is desired to be attached to that particular press. It is critical that the separate halves of the mold base secured to the two platens must be properly and accurately aligned in order that the mold cavities in upper and lower cavity plates of the mold base be aligned to produce the desired part. Thus it is critical that the two halves of the mold base containing the upper and lower cavity plates, respectively, be not only properly aligned relative to each other, but must be further secured and aligned on relation to the individual platens of the press to which they are attached to assure such alignment. The prior art has utilized various alignment pins and quite complicated arrangements to achieve a form of adaptability of mold bases to the platens of certain various major available presses. To date, there has not been a simple and inexpensive means for adapting small mold bases to the varying platens of the particular larger presses which are desired to be utilized which achieve the desired critical alignment of the mold cavities.

Briefly, the herein invention comprises two adapter plates which serve as universal mounting means for mold bases to be secured to the platens of differing presses. One adapter plate is used and designed to secure an ejector half including an ejector housing and lower cavity plate to a platen while the second plate secures the sprue half upper cavity plate to an opposite platen of a press. Both plates have a plurality of threaded apertures formed therein which are pre-positioned in the plates to be alignable with apertures of major presses presently utilized so that the plates can be threadably secured to the platens of differing presses depending upon the alignment of the apertures in the plates with those of the presses. The first plate further has from one to three or more large holes therein through which press stripper bars can pass to engage an ejector plate of the mold base. Additionally, the first plate has two dowel pins of differing diameter extending therefrom in a predetermined location on the plate. When the plate is secured to a platen the dowel pins extend from the opposite side of the plate and will mate with corresponding holes provided in the ejector housing of a mold base so that the ejector housing is properly aligned relative to the press platen and the adapter plate.

The second adapter plate has a large central opening through which can be disposed and seated therein a sprue bushing. Further, the second plate also has two dowel pins of differing diameter which can be seated in like receptacles in the upper cavity plate of the mold base to properly align it relative to the lower cavity plate. The two cavity plates are coalignable by leader or guide pins extending from the upper cavity plate to be seated in corresponding receptacles provided in the lower cavity plate. Additional threaded apertures are provided in both adapter plates so that the halves of the mold base to be attached thereto can be threadably secured to each plate. A further feature of the invention is to provide in the mold base utilized with the system a set screw through the side of an ejector housing of the mold base, which can prevent an ejector plate assembly portion of the mold base from moving prior to use or during storage or transport.

Other features of the invention will become further apparent from the following detailed description and drawings in which:

FIG. 1 is a side elevation partially in section of a mold assembly of this invention.

FIG. 2 is an elevational view of an ejector assembly portion shown in FIG. 1.

FIG. 3 is a perspective view of an adapter plate for an ejector assembly portion of a mold base.

FIG. 4 is a fragmentary section taken along line 4—4 of FIG. 2 illustrating alignment pins for the ejector portion of the mold base assembly.

FIG. 5 is a perspective view of an adapter plate for sprue plate half of a mold base.

FIG. 6 is a fragmentary section corresponding to FIG. 4 for the sprue portion of the mold base assembly.

FIG. 7 is a side elevational partially in section showing an adapter plate of the invention for the ejector portion of an alternate type of mold base.

Turning now to the drawings there is seen opposite press platens 11 and 13 (Fig. I). The press platens are part of the overall large presses utilized for injection molding. The press platens for this segment of application generally have pre-drilled holes therein to which mold bases and the like can be secured. The first press platen 11 will have at least one aperture 15 therethrough in which a slidable press stripper bar (not shown) will pass. The opposite press platen 13 has a large opening 17 therein through which the nozzle of an injector can be seated to inject the material into the mold. The herein invention utilizes a first adapter plate 19 which is affixed to the first platen 11. The adapter plate 19 has four apertures 21 formed therein in predetermined locations according to the apertures that are found in two major presses. The plate has an additional four apertures 22 which correspond to holes formed in the platen of another major press. As shown in FIG. 1, for example, apertures 21 are aligned with corresponding holes 24 in the platen of one press. The plate 19 is then secured to the press platen by bolts 23 which threadably engage the aperture 21.

The adapter plate 19 is provided preferably with two oval holes 25 which are coalignable with the holes 15 provided in the press platen to allow stripper bars to pass therethrough. Depending upon the application in the press, from one to three stripper bars are often utilized. Adapter plate 19 may additionally be provided with a circular recess 27 formed therein which corresponds to a like recess 29 which may exist in the press platen. A locating ring 31 can then be seated in recesses 27 and 29 secured by screws 33 seated in topped holes 34 in the adapter plate. The locating ring 31 further serves to properly align the adapter plate to the platen 11, though it is not mandatory or required. However, some platens do have aligning recesses 29 formed therein and it might be desirable for some applications to so utilize a locating ring.

On the side 35 of the adapter plate 19 opposite from the side 36 affixed to the press platen 11 there extends two dowel pins 37 and 39 respectively as particularly seen in FIG. 3. The dowel pins 37 and 39 are of differing diameter. For example, pin 37 can be three-eighths inch in diameter while the diameter of pin 39 can be one-half inch. The dowel pins 37 and 39 are important in assuring proper location of an ejector half 41 of a mold base assembly 43 to the adapter plate 19. The ejector half 41 of the mold base assembly 43 in the embodiment shown is comprised of a lower cavity plate 45, an ejector housing 47 and a slidable ejector plate assembly 49. The dowel pins 37 and 39 on the adapter mate with corresponding apertures 51 and 53 respectively formed in the ejector housing 47 thus assuring that the housing is properly aligned relative to the adapter.

Two bolts 52 secure the lower mold cavity plate 45 to the ejector housing 47. An additional two bolts 54 pass through both the lower mold cavity plate 45 and ejector housing 47 and are threadably engaged in a first pair of threaded apertures 55 formed in the adapter plate 19 securing the ejector half 41 of the mold base assembly to the adapter plate.

A second pair of threaded apertures 56 in the adapter plate are used to secure a larger mold base to the adapter in a similar manner. In the ejector half 41 of the mold base ejector pins 57 and sprue puller pin 58 are affixed to the ejector plate assembly 49 and will move therewith when the ejector plate assembly is forced to move by the stripper bars (not shown) passing through the apertures 15 and 25 in the platen 11 and adapter plate 19 respectively. As can be seen, the ejector plate assembly 49 is thus freely slidable within the ejector housing 47. In order to prevent undue movement during shipping and handling an aperture 59 is provided through the walls of the ejector housing 47 having a set screw 60 disposed therein which can be tightened to engage the ejector plate assembly 49 and prevent its movement prior to utilization.

A second adapter plate 61, as shown in FIG. 5, is affixed to the sprue platen 13 in the same manner as described with regard to the first adapter plate 19. Thus adapter plate 61 has four apertures 63 formed therein corresponding to apertures in two standard platens and apertures 21 in adapter plate 19 such that bolts 65 can secure the adapter plate 61 to those platens. An additional four apertures 64 corresponding to apertures 22 in adapter 19 serve as means for securing the adapter plate to another standard plate. Likewise, an upper sprue half including a cavity plate 67 is affixed by bolts 69 to a first pair of threaded apertures 71 provided in the adapter plate 61. A second pair 72 of threaded apertures serves to secure larger mold base to the adapter. Once again to assure proper alignment of the upper cavity plate 67 to the adapter plate 61 two dowel pins 73 and 75 respectively are located on the adapter plate 61 extending toward the upper cavity plate 67 engaging corresponding apertures 76 and 78 respectively of differing diameters formed therein to assure the proper location of the adapter plate. Thus the mold halves cannot be rotated 180° out of alignment with each other so that cavities will always match.

Two guide pins 77 and 79 respectively extend from the upper cavity plate 67 toward the lower cavity plate. The guide pins 77 and 79 are seatable within corresponding receptacles 81 and 83 provided within the mating surface 85 of the lower cavity plate further assuring proper and precise alignment of the upper and lower cavity plates to each other. Adapter plate 61 and the upper cavity plate 67 have corresponding apertures 89 and 87 formed respectively therein in which is seated a separate sprue bushing 91 having a center aperture 93 therein through which the molding material is directed. The bushing is press fitted into aperture 87 in the upper cavity plate 67. The utilization of such a bushing permits one to vary the size of the opening 93 depending upon the material utilized in the application of the mold device. A locating ring 95 is provided seated within the corresponding aperture formed by both an enlarged countersunk portion 97 formed in the adapter plate 61 and sprue opening portion 99 in the platen. The locating ring 95 is secured to the adapter plate 61 by screws 96 which engage tapped holes 98 therein.

As has been indicated, each of the adapter plates disclosed herein have two sets of four apertures, which are alignable with corresponding apertures on four major press platens. If a press platen is utilized other than those four that are particularly coalignable with the apertures provided in the plates, the same apertures can still be utilized by drilling corresponding holes in a press platen and securing the adapter plate to that press platen, still utilizing one of the two sets of four platen apertures provided in the adapter plates. Alternatively, the adapter plates can be clamped onto the press platen. It is to be noted that the particular mold base assembly 43 does not have any flanged areas which can be readily clamped onto press platen in order to secure the mold base. Thus, the adapter plates will serve the function to permit clamping while allowing interchangeability of varying mold bases.

It is further pointed that the herein invention is particularly useful when the mold base 43 has outer dimensions less than the spacing between the holes preformed in the press platen through which securing bolts can pass as is the case in the embodiment shown. Where large mold bases have been utilized in the past, within a given range of application, the mold bases have been provided with corresponding apertures formed therein which are coalignable with the predrilled holes in the press platen to allow the mold base to be directly secured to the platen. However, for many applications it is desirable to use lightweight and inexpensive small mold bases where high mold cycling speed is desired and only one or two cavities in the mold base are required. Heretofore, the utilization of such small mold bases, as for example shown in the herein drawings, thus has not been readily feasible with the large platen and one has had to utilize larger mold bases than actually needed or desired so that they could be directly secured to the preformed holes in the platen. It is also much easier to mount the mold base to the adapter plate from the parting line or mating surfaces than to mount the mold base onto the press platens by coming through with screws from the rear or machine side of the press platens.

In order to properly align the adapter plates 19 and 61 relative to the press platen 11 and 13, the mold base half first is affixed to the adapter plates. That is, the lower portion 41 of the mold base is attached to adapter plate 19 by the bolts 54 while the upper cavity plate 67 is attached by bolts 69 to its adapter plate 61. The two halves are then placed together such that the guide pins 77 and 79 on the upper cavity plate are seated within their corresponding apertures 81 and 83 of the lower cavity plate. The assembly is then held between the press platens 11 and 13 which are moved together the required spacing so that the platens will be resting against the corresponding adapter plates. The adapter plates are then resultantly aligned and bolted to the press platen. The press platen then can be separated with the assurance that the proper alignment has been obtained. The mold base can now be attached to the adapter plates by means of screws or bolts. Subsequently the mold base assembly 43 can be removed from adapter plates and new or differing mold bases can then be attached to the adapter plates without concern for the alignment problem.

Turning to FIG. 7 there is seen an ejector half of a two-plate mold base assembly which differs from that shown in FIG. 1 in that it does not have a separate lower cavity plate. The two-plate assembly includes a lower cavity plate 103 which is secured to its adapter plate 105. The lower cavity plate 103 also serves as an ejector housing by having a cavity 107 formed therein in which the ejector plate assembly 109 is free to move.

What is claimed is:

1. An injection molding assembly comprising:
   a mold base comprising separate ejector and sprue portions,
   first and second press platens,
   first and second adapter plates for attachment to said first and second platens respectively, each of said adapter plates having a plurality of sets of differently located threaded apertures formed therein, each of said aperture sets being arranged to mate with apertures on a different press platen,
   said press platens each having a set of threaded apertures formed therein which match one of the sets of apertures on the corresponding adapter plates,
   a plurality of bolts for securing said first and second adapter plates to said first and second press platens respectively, said bolts being fitted in the matching sets of apertures in said platens and adapter plates,
   said adapter plates each having a pair of alignment dowel pins extending therefrom, the pins of each pair having different diameters from each other, said ejector and sprue portions of said mold base each having apertures formed therein for receiving the dowel pins of said first and second adapter plates respectively, and
   bolt means for removably securing said ejector and sprue portions to said first and second adapter plates respectively, said dowel pins aligning said ejector and sprue portions with said adapter plates.

2. The adapter plates of claim 1 wherein each plate has two groups of four threaded apertures each, each group alignable with corresponding apertures in differing press platens.

3. The adapter plates of claim 1 further comprising:
   recesses formed in each plate on a side thereof co-alignable with corresponding recesses in the platen to which the plates are attachable,
   and a separate locating ring capable of being fixedly secured partially within the recesses of said plates, said rings engageable with the corresponding recesses in said platen when said plates are attached to said platen.

4. The adapter plates of claim 1 further comprising:
   two oval holes provided in said first plate and adapted to receive stripper bars therethrough.

5. The adapter plate of claim 1 further comprising:
   an enlarged hole in said second plate for continuing a portion of a separate sprue bushing insertable therethrough.

* * * * *